United States Patent
Martin et al.

(10) Patent No.: US 9,970,510 B2
(45) Date of Patent: May 15, 2018

(54) AUTOMATIC TRANSMISSION FOR A VEHICLE

(71) Applicants: Berthold Martin, Shelby Township, MI (US); Glenn Giudici, Commerce Township, MI (US)

(72) Inventors: Berthold Martin, Shelby Township, MI (US); Glenn Giudici, Commerce Township, MI (US)

(73) Assignee: FCA US LLC, Auburn Hills, MI (US)

( * ) Notice: Subject to any disclaimer, the term of this patent is extended or adjusted under 35 U.S.C. 154(b) by 37 days.

(21) Appl. No.: 15/182,797

(22) Filed: Jun. 15, 2016

(65) Prior Publication Data
US 2017/0219054 A1    Aug. 3, 2017

Related U.S. Application Data

(60) Provisional application No. 62/290,181, filed on Feb. 2, 2016.

(51) Int. Cl.
*F16H 3/66* (2006.01)
*F16H 57/08* (2006.01)
(Continued)

(52) U.S. Cl.
CPC .............. *F16H 3/66* (2013.01); *F16H 57/08* (2013.01); *F16H 61/0265* (2013.01);
(Continued)

(58) Field of Classification Search
CPC ....... F16H 2003/442; F16H 2200/2094; F16H 2200/2046; F16H 2200/2012; F16H 2200/0065; F16H 2200/2064
See application file for complete search history.

(56) References Cited

U.S. PATENT DOCUMENTS 4,405,039 A    9/1983    Hauser
6,752,738 B1   6/2004    Martin et al.
(Continued)

FOREIGN PATENT DOCUMENTS

EP    2245336 A1    11/2010
WO    2009106409 A1    9/2009

OTHER PUBLICATIONS

Lutz Gaertner et al, "The ZF Automatic Transmission 9HP48 Transmission System, Design and Mechanical Parts", SAE International Journal of Passenger Cars—Mechanical Systems, vol. 6, No. 2, May 20, 2013, pp. 908-917, XP055214630, ISSN: 1946-4002, DOI: 10-4271/2013-01-1276 figures 3, 5.
(Continued)

*Primary Examiner* — Ramya P Burgess
*Assistant Examiner* — Lillian T Nguyen
(74) *Attorney, Agent, or Firm* — Ralph E. Smith

(57) ABSTRACT

A multi-speed automatic transmission includes a housing, a transmission input shaft, and a plurality of clutches. Different combinations of clutches of the plurality of clutches are engaged to generate different gear ratios corresponding to respective forward speeds of the automatic transmission. The plurality of clutches are positioned within the housing and include a first friction clutch coupled the input shaft and having a first hub, and a second friction clutch having a second clutch hub. The second friction clutch is disposed about the input shaft and radially nested within the first clutch hub such that the second friction clutch is positioned radially between the first clutch hub and the input shaft. The first friction clutch is engaged to generate at least two forward speeds of the transmission and the second friction clutch is engaged to generate seven forward speeds of the transmission including the two forward speeds.

11 Claims, 4 Drawing Sheets

(51) Int. Cl.
*F16H 61/02* (2006.01)
*F16H 3/44* (2006.01)

(52) U.S. Cl.
CPC .. *F16H 2003/442* (2013.01); *F16H 2057/087* (2013.01); *F16H 2200/0065* (2013.01); *F16H 2200/2012* (2013.01); *F16H 2200/2046* (2013.01); *F16H 2200/2064* (2013.01); *F16H 2200/2094* (2013.01)

(56) References Cited

U.S. PATENT DOCUMENTS

| | | | |
|---|---|---|---|
| 7,410,446 B2 | 8/2008 | DeMarco | |
| 7,556,582 B2 | 7/2009 | Gumpoltsberger | |
| 7,670,260 B2 | 3/2010 | DeMarco | |
| 7,731,624 B2 * | 6/2010 | Nishida | F16D 25/0638 192/48.619 |
| 7,789,792 B2 | 9/2010 | Kamm et al. | |
| 8,398,522 B2 | 3/2013 | Bauknecht et al. | |
| 8,663,066 B2 | 3/2014 | Thomas et al. | |
| 8,721,483 B2 | 5/2014 | Ziemer et al. | |
| 8,858,393 B2 | 10/2014 | Nogle | |
| 9,086,146 B2 | 7/2015 | Arnold et al. | |
| 2011/0009229 A1 | 1/2011 | Bauknecht et al. | |
| 2011/0009299 A1 | 1/2011 | Zanten | |
| 2013/0288847 A1 | 10/2013 | Scherer et al. | |
| 2014/0038764 A1 * | 2/2014 | Goleski | F16H 3/66 475/275 |
| 2014/0129119 A1 | 5/2014 | Park | |
| 2014/0236438 A1 | 8/2014 | Arnold et al. | |
| 2015/0354700 A1 * | 12/2015 | Sugiura | F16H 63/304 475/138 |

OTHER PUBLICATIONS

International Search Report and Written dated Apr. 13, 2017 for International Application No. PCT/US2017/013004, International Filing Date Jan. 11, 2017.

* cited by examiner

| GEAR | BRAKE/CLUTCH | | | | | DOG CLUTCH | RATIO | RATIO/STEPS |
|---|---|---|---|---|---|---|---|---|
| | C | D | B | E | A | F | | |
| 1 | | O | | | O | O | 4.70 | |
| 2 | O | | | | O | O | 2.84 | 1.65 |
| 3 | | | O | | O | O | 1.90 | 1.49 |
| 4 | | | | O | O | O | 1.38 | 1.38 |
| 5 | O | | O | O | O | | 1.00 | 1.38 |
| 6 | O | | | O | O | | 0.80 | 1.24 |
| 7 | | O | | O | O | | 0.70 | 1.16 |
| 8 | | O | O | O | | | 0.58 | 1.21 |
| 9 | | O | O | O | | | 0.48 | 1.21 |
| R | | O | O | | | O | -3.80 | TOTAL 9.81 |

FIG. 3

AUTOMATIC TRANSMISSION FOR A VEHICLE

CROSS REFERENCE TO RELATED APPLICATION

This application claims the benefit of U.S. Provisional Application Ser. No. 62/290,181, filed Feb. 2, 2016, the contents of which are incorporated herein by reference thereto.

FIELD

The present application relates generally to an automatic transmission and, more particularly, to a clutch arrangement for improved shifting performance of a motor vehicle automatic transmission.

BACKGROUND

Some automatic transmissions may include clutches that must be rotationally synchronized before they can be engaged, such as a dog clutch. However, use of such a clutch with the required time for synchronization may require a longer duration of time for clutch engagement to occur, for example, when shifting from Reverse (R) to Drive (D) or when downshifting multiple gears. Thus, while such transmissions and associated clutch systems work for their intended purpose, it is desirable to provide improved shifting performance in an automatic transmission.

SUMMARY

In accordance with one example aspect of the invention, a multi-speed automatic transmission is provided. In one exemplary implementation, the transmission includes a housing, a transmission input shaft, and a plurality of clutches. Different combinations of clutches of the plurality of clutches are engaged to generate respective different gear ratios corresponding to respective forward speeds of the automatic transmission. The plurality of clutches includes a first friction clutch coupled the input shaft and having a hub, and a second friction clutch having a second hub and disposed about the input shaft and radially nested within the first clutch hub such that the second clutch is positioned radially between the first clutch hub and the input shaft. The first friction clutch is engaged to generate at least two forward speeds of the transmission and the second friction clutch is engaged to generate seven forward speeds of the transmission including the two forward speeds.

In addition to the foregoing, in one exemplary implementation, the second friction clutch includes a clutch pack associated with the second friction clutch hub, and the clutch pack includes alternating first and second friction discs. The first friction discs are directly coupled to the second friction clutch hub and the second friction discs are directly coupled to the first friction clutch hub.

In an exemplary implementation, the first and second friction clutch hubs each include an axially extending base leg portion coupled to input shaft, a radially extending first arm portion, and an axially extending second arm portion extending from the first arm portion. In this exemplary implementation, the second friction clutch is nested within the hub of the first friction clutch such that the axially extending second arm portion of the second clutch is disposed radially between the input shaft and the axially extending second arm portion of the first clutch. In addition, the radially extending first arm portion of the second clutch may be positioned beneath the axially extending second arm portion of the first clutch and radially between the input shaft and the axially extending second arm portion of the first clutch.

In an exemplary implementation, the transmission a third clutch, a fourth clutch, a fifth clutch, and a sixth clutch; wherein the third clutch, the fourth clutch and the fifth clutch are each brake clutches and the sixth clutch is a dog clutch. In one exemplary implementation, the automatic transmission only includes a single dog clutch.

In one exemplary implementation, the transmission includes nine forward speeds, and different combinations of three clutches of the plurality of clutches are engaged to generate the respective different gear ratios corresponding to the respective nine forward speeds of the transmission.

BRIEF DESCRIPTION OF DRAWINGS

FIG. 3 is a view of a table illustrating engagement of various transmission clutches in connection with shifting of various transmission gears in accordance with the principles of the present application.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

As briefly mentioned above, the present application is directed to a system and method for improving shifting in an automatic transmission. In one exemplary implementation, the present application relates to an improved system and method for engaging a clutch element without rotational synchronization requirements and subsequent time delays in transmission shifting function. In one exemplary implementation, a friction disc clutch, nested within an envelope of another friction disc clutch, is utilized to provide the improved transmission shifting attributes.

Figure 1:
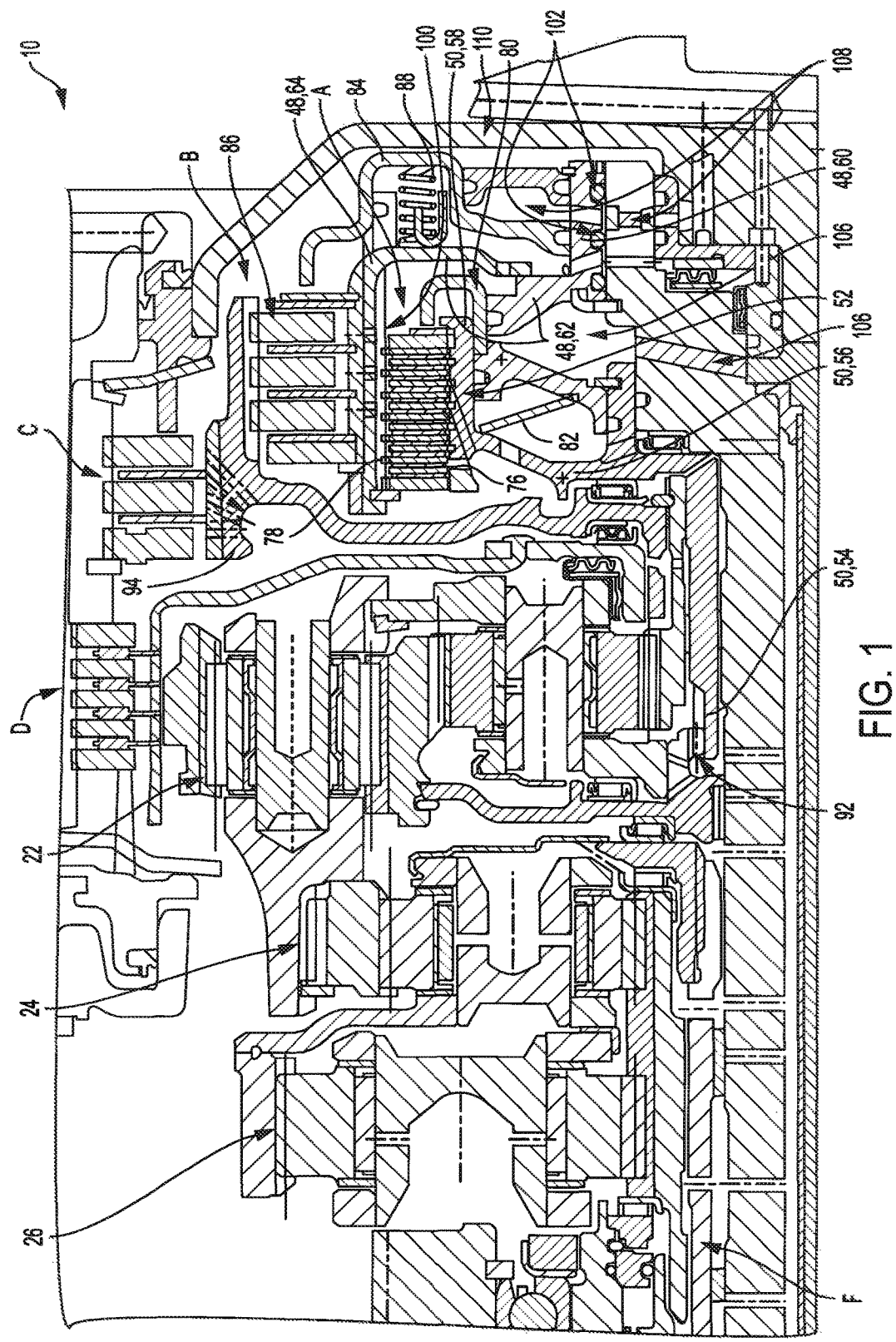
FIG. 1 is a partial schematic view of an exemplary motor vehicle nine-speed automatic transmission in accordance with the principles of the present application.
Figure 2:
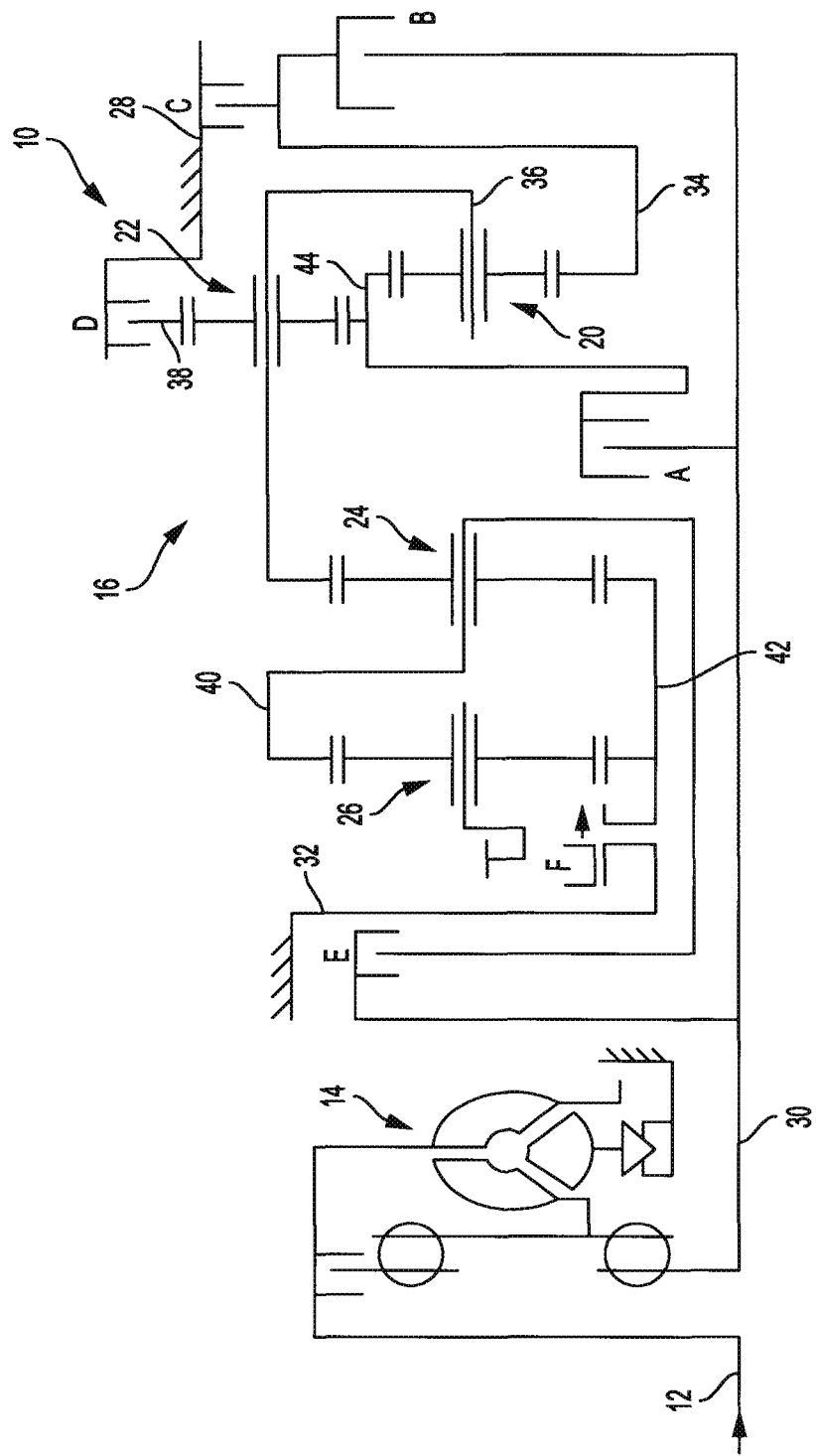
FIG. 2 is a partial schematic illustration of the exemplary automatic transmission of FIG. 1 in accordance with the principles of the present application.

Referring to FIGS. 1-3, a nine-speed automatic transmission for use in a motor vehicle is generally shown and indicated at reference numeral 10. However, the systems and methods described herein are not limited to nine-speed automatic transmissions and may be utilized in other transmissions such as, for example, an eight-speed automatic transmission. As shown in FIG. 2, the nine-speed automatic transmission 10 is linked to an engine (not shown) through an engine output shaft 12. Rotational output from the engine output shaft 12 is received by the automatic transmission 10 through a torque converter assembly 14. The torque converter assembly 14 then transfers the rotational output through a gear set 16 to a transmission output shaft 32, and then on to the drivetrain of the motor vehicle.

The gear set 16 of the automatic transmission 10 includes a first planetary gear set 20, a second planetary gear set 22, a third planetary gear set 24, a fourth planetary gear set 26, and a housing 28. In one exemplary implementation, the first and second planetary gear sets 20, 22 form a shiftable front-mounted gear set, and the third and fourth planetary gear sets 24, 26 form a main gear set.

With particular reference to FIG. 2, in the exemplary implementation, the automatic transmission 10 comprises six shift elements including three clutches and three brakes. In particular, automatic transmission 10 includes a first clutch A, a second clutch B, a third clutch E, and a fourth clutch F, as well as a first brake/clutch C and a second brake/clutch D. Clutches A, B and E are, in the exemplary implementation illustrated, friction clutches. In the example nine-speed automatic transmission 10, selective shifting of nine forward gears and one reverse gear are accomplished with the six shift elements. As will be described herein in more detail, in one exemplary implementation, first clutch A is a friction disc clutch, and fourth clutch F is a dog clutch.

In one exemplary implementation, the automatic transmission 10 includes eight rotatable shafts 30, 32, 34, 36, 38, 40, 42, and 44, as illustrated in FIG. 2. The clutches A, B, and E are each selectively engageable to receive torque input from the torque converter assembly 14 via transmission input shaft 30. The carriers of the first and second planetary gear sets 20, 22 are coupled together by shaft 36, which is connected to the ring gear of the third planetary gear set 24. The ring gear of the first planetary gear set 20 is coupled to the sun gear of the second planetary gear set 22 through shaft 44, which is selectively coupled to the input shaft 30 by disc clutch A.

The sun gear of the first planetary gear set 20 is coupled to housing 28 through shaft 34 and the brake clutch C. The first planetary gear set 20 is selectively coupled to the transmission input shaft 30 through disc clutch A. The ring gear of the second planetary gear set 22 is coupled to the housing 28 through shaft 38 and brake clutch D.

In the exemplary implementation, shaft 40 is coupled to the ring gear of the fourth planetary gear set 26 and to the carrier of the third planetary gear set 24. The shaft 40 is selectively coupled to the transmission input shaft 30 and clutch E, while shaft 42 is coupled to the sun gears of the third and fourth planetary gear sets 24, 26. The shaft 42 is coupled to transmission housing 28 through dog clutch F. The output shaft 32, which produces output drive for the vehicle, is coupled to the carrier of the fourth planetary gear set 26.

FIG. 3 illustrates an exemplary shift pattern of the nine-speed automatic transmission 10. The table illustrates the combination of clutches and brakes engageable to achieve specific torque input-to-output ratios. In the example table, each clutch and brake combination corresponds to one of nine forward gear speeds and a reverse speed. The shift pattern illustrates example transmission ratios of the individual gear steps, as well as the gear increments and step changes. In this particular transmission, three shift elements are engaged for every gear, as represented by the circles in the table cells.

As discussed above, clutch F may be designed as a locking shift element or dog clutch element. In one exemplary implementation, the dog clutch F and associated components include a male externally splined clutch member, a female internally splined clutch member configured to receive the male clutch member for engagement of the dog clutch F, a piston, a sensing sleeve and associated sensor(s) and fluid passages.

Clutch element A is designed as a friction disc clutch. Unlike a dog clutch, which requires rotational speed synchronization prior to and during engagement, disc clutch A enables immediate or substantially immediate engagement without the aforementioned time delays because no speed synchronization and tooth engagement is required with friction or disc clutch A.

Figure 4:
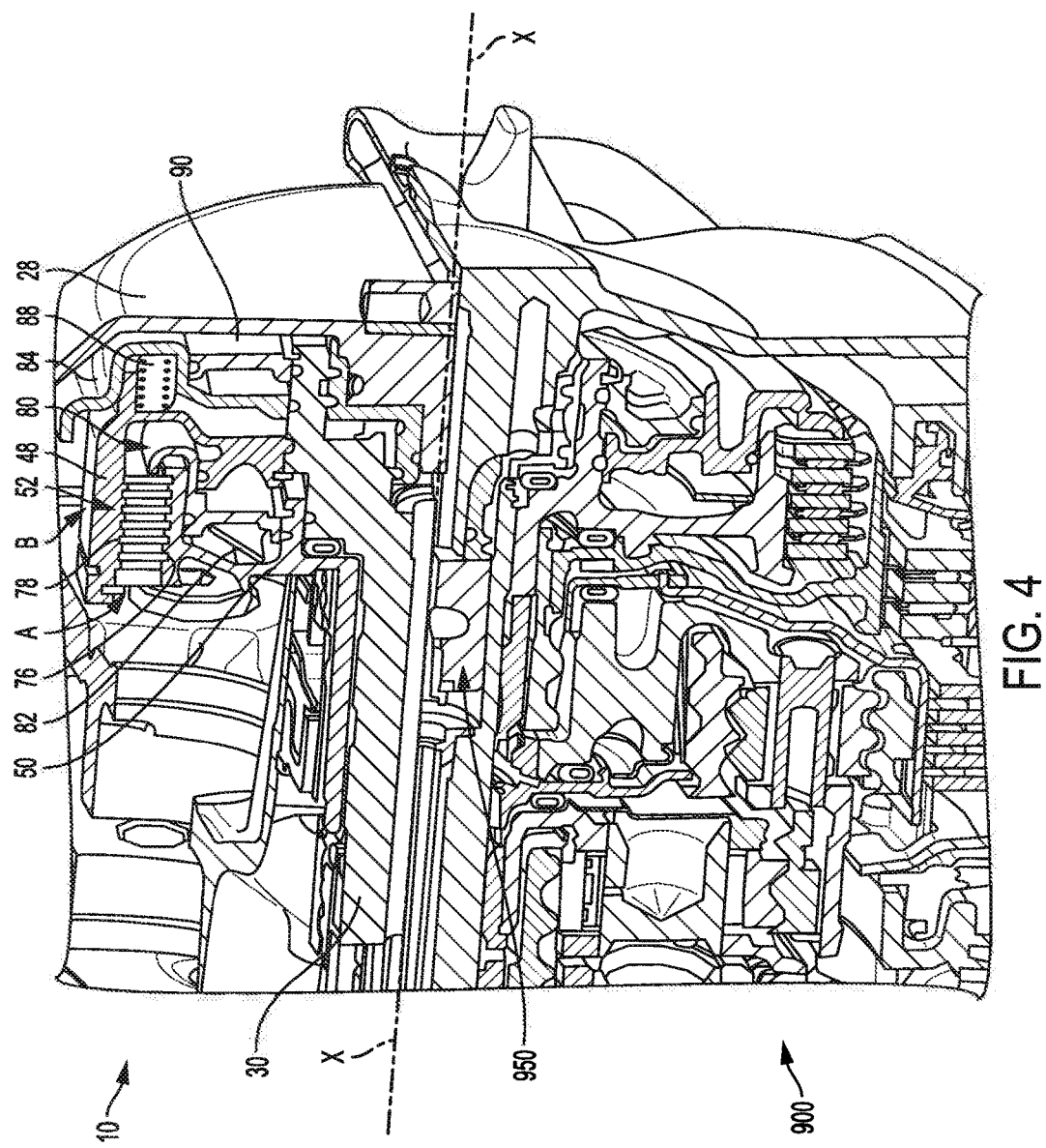
FIG. 4 is perspective sectional composite illustration comparing the exemplary nine-speed automatic transmission of FIG. 1 (shown above line 'X') with a typical nine-speed automatic transmission (shown below line 'X') in accordance with the principles of the present application.

FIG. 4 is a composite illustration comparing the nine-speed automatic transmission 10 of the present application (shown above line 'X') compared with a typical nine-speed automatic transmission 900 (shown below line 'X'). As illustrated, the typical nine-speed automatic transmission includes a clutch element A formed as a dog clutch 950. The dog clutch 950 arrangement is desirable for its reduced packaging size and reduced drag, which improves transmission efficiency.

However, due to its splined structure, dog clutch 950 requires rotational synchronization(s) when moving to an engaged position due to the metal-to-metal meshing engagement between spline teeth of dog clutch 950 and spline teeth of the receiving member. The spline teeth of each component will not mesh well if they are not spinning the same speed, thereby requiring rotational synchronization, which may subsequently cause time delays in transmission shifting function. For example, transmission 900 may experience a delay or hesitation during shifting, particularly when shifting from reverse (R) to drive (D), or downshifting from $8^{th}$ gear to $4^{th}$ gear. Further, a typical requirement of full or substantially full engagement of the dog clutch male and female toothed members may cause an additional time delay in shifting associated transmission gears.

In contrast to the typical nine-speed automatic transmission 900, the nine-speed automatic transmission 10 of the present application includes a friction disc clutch as clutch element A. Unlike a dog clutch, disc clutch A provides a smoother and more immediate engagement during shifting, thereby eliminating the rotational synchronization requirements before and during engagement that can cause subsequent potentially objectionable time delays when shifting. As such, disc clutch A provides improvement in shift time and shift quality. Moreover, disc clutch A can be packaged within transmission 10 without extending the length of the typical nine-speed transmission 900, thereby enabling automatic transmission 10 to be used in vehicles designed to accept transmission 900

With reference to FIGS. 1 and 4, transmission 10 includes a friction disc clutch element A instead of a dog clutch element. In the illustrated implementation, disc clutch A is radially nested within a hub 48 of clutch B such that clutch A is positioned radially between hub 48 and input shaft 30. Moreover, in some examples, clutch A is located radially below clutches B, C, D, and E, radially above clutch F, and axially relative to clutches C, D, E, and F. In this exemplary implementation, the dog clutch F is the only dog clutch in the transmission 10.

Disc clutch A includes a hub 50 and a multi-plate clutch pack 52. In the example implementation, hub 50 is disposed about input shaft 30 and includes an axially extending base leg portion 54 coupled to shaft 30, a radially extending first arm portion 56, and an axially extending second arm portion 58. Similarly, clutch B hub 48 includes an axially extending base leg portion 60 coupled (e.g., splined) to shaft 30, a radially extending first arm portion 62, and an axially extending second arm portion 64.

Multi-plate clutch pack 52 is formed of intermeshed, alternating first and second friction discs 76, 78. The first friction discs 76 are externally coupled (e.g., splined) to hub 50, and the second friction discs 78 are internally coupled (e.g., splined) to the clutch B hub 48. When disc clutch A is disengaged, the first friction discs 76 rotate freely between the second friction discs 78. When disc clutch A is engaged, for example through pressure applied by a hydraulic piston 80, first friction discs 76 frictionally engage the second friction discs 78, and disc clutch A is subsequently rotated by clutch B hub 48, which is coupled to input shaft 30 for rotation therewith. When engaged, disc clutch A transfers rotary motion through a toothed or splined connection 92 (FIG. 1) to drive a ring gear that goes into the carrier. A return spring 82 causes first friction discs 76 to disengage the second friction discs 78 when the hydraulic pressure is released from hydraulic piston 80.

In one exemplary implementation, a second hydraulic piston 84 is coupled to input shaft 30 and configured to engage a clutch pack 86 of clutch B with a hub 94 of clutch C (see FIG. 1). A return spring 88 causes clutch pack 86 (shown only in FIG. 1) to disengage when hydraulic pressure is released from the hydraulic piston 84. A retainer 90 is coupled between input shaft 30 and second hydraulic piston 84 and is configured to retain the second hydraulic piston 84 on the shaft 30.

With continued reference to FIG. 4, automatic transmission 10 includes various additional modifications that distinguish it from the typical nine-speed automatic transmission 900. In particular, clutch B hub 48 has been modified to include an internal spline 100 for clutch A (i.e., discs 78 are splined to hub 48), seal grooves 102 are provided for pistons 80 and 84, and feed holes (not shown) are provided to clutch A circuit 106 and clutch B circuit 108. Additionally, input shaft 30 is provided with a spline for connecting and driving clutch B hub 48. Moreover, because packaging space is limited for automatic transmission 10, a case rear wall 110 was reshaped, internal ribs (not shown) were removed, and rear lube-feed worm trails and cover plate (not shown) were replaced with cross drills and plugs (not shown) to create additional space.

The systems and methods described herein provide an automatic transmission with improved shifting. The transmission replaces a typical dog clutch arrangement of clutch element A with a disc clutch arrangement. The replacement is such that no change in length or size is required for the transmission. Moreover, the disc clutch A is radially nested within the envelope of the B clutch, which improves packaging. The disc clutch A arrangement eliminates the need for rotational synchronization and subsequent time delays in the transmission function associated with dog clutch A arrangements. Accordingly, the disc clutch A arrangement improves vehicle function when shifting to drive (D) from park (P), reverse (R), or neutral (N), and improves shift time coming out of $8^{th}$ gear.

It will be understood that the mixing and matching of features, elements, methodologies, systems and/or functions between various examples are expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A multi-speed automatic transmission comprising:
 a housing;
 a transmission input shaft; and
 a plurality of clutches positioned in the housing, wherein different combinations of clutches of the plurality of clutches are engaged to generate different gear ratios corresponding to respective forward speeds of the automatic transmission, the plurality of clutches including:
  a first friction clutch coupled the input shaft and having a first hub;
  a second friction clutch having a second hub, the second friction clutch disposed about the input shaft and radially nested within the hub of the first friction clutch such that the second friction clutch is positioned radially between the hub of the first friction clutch and the input shaft; and
  a third clutch, a fourth clutch, a fifth clutch, and a sixth clutch, wherein the third clutch, the fourth clutch and the fifth clutch are each brake clutches and the sixth clutch is a dog clutch;
 wherein the first friction clutch is engaged to generate at least two forward speeds of the transmission and the second friction clutch is engaged to generate seven forward speeds of the transmission including the two forward speeds.

2. The automatic transmission of claim 1, wherein the second friction clutch includes a clutch pack associated with the second friction clutch hub; and
 wherein the clutch pack includes alternating first and second friction discs, the first friction discs directly coupled to the second friction clutch hub, and the second friction discs directly coupled to the first friction clutch hub.

3. The automatic transmission of claim 1, wherein the first and second friction clutch hubs each include an axially extending base leg portion coupled to input shaft, a radially extending first arm portion, and an axially extending second arm portion extending from the first arm portion.

4. The automatic transmission of claim 3, wherein the second friction clutch is nested within the hub of the first friction clutch such that the axially extending second arm portion of the second clutch is disposed radially between the input shaft and the axially extending second arm portion of the first clutch.

5. The automatic transmission of claim 4, wherein the radially extending first arm portion of the second clutch is positioned beneath the axially extending second arm portion of the first clutch and radially between the input shaft and the axially extending second arm portion of the first clutch.

6. The automatic transmission of claim 5, wherein the radially extending first arm portion of the second clutch is positioned between the input shaft and the axially extending second arm portion of the second clutch.

7. The automatic transmission of claim 1, wherein the automatic transmission only includes a single dog clutch.

8. The automatic transmission of claim 1, wherein the transmission comprises nine forward speeds; wherein different combinations of three clutches of the plurality of clutches are engaged to generate the respective different gear ratios corresponding to the respective nine forward speeds of the transmission, and wherein the first friction clutch is engaged to generate three forward speeds of the transmission.

9. The automatic transmission of claim 1, further comprising a hydraulic piston configured to move the second friction clutch between a disengaged position and an engaged position.

10. The automatic transmission of claim 9, further comprising a second hydraulic piston configured to move a clutch pack of the first friction clutch between a disengaged position and an engaged position.

11. The automatic transmission of claim 10, further comprising a retainer coupled between the transmission input shaft and the second hydraulic piston.

* * * * *